(12) United States Patent
Hintz et al.

(10) Patent No.: US 6,731,098 B1
(45) Date of Patent: May 4, 2004

(54) METHOD AND APPARATUS FOR SENSING VARIABLE CURRENTS WITHIN THE ALTERNATOR OF A GENSET THAT EMPLOYS AN AMPLIFIER AND A SWITCHED FEEDBACK RESISTANCE

(75) Inventors: David A. Hintz, Sheboygan Falls, WI (US); Kenneth R. Bornemann, Cato, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 09/695,604

(22) Filed: Oct. 24, 2000

(51) Int. Cl.$^7$ .......................... H02H 7/06; H02P 11/00; H02P 9/00
(52) U.S. Cl. .......................................... 322/44; 322/17
(58) Field of Search ..................... 322/44, 17; 379/399, 379/413; 363/89

(56) References Cited

U.S. PATENT DOCUMENTS

| | | | |
|---|---|---|---|
| 4,644,138 A | * 2/1987 | Walsh | ............ 219/501 |
| 4,701,690 A | 10/1987 | Fernandez et al. | |
| 4,777,425 A | 10/1988 | MacFarlane | |
| 4,800,291 A | 1/1989 | Bowers | |
| 4,839,575 A | 6/1989 | MacFarlane | |
| 5,231,344 A | * 7/1993 | Marumoto et al. | ............ 322/14 |
| 5,262,711 A | * 11/1993 | Mori et al. | ............ 322/28 |
| 5,294,879 A | 3/1994 | Freeman et al. | |
| 5,309,312 A | 5/1994 | Wilkerson et al. | |
| 5,444,378 A | * 8/1995 | Rogers | ............ 324/428 |
| 5,477,827 A | 12/1995 | Weisman, II et al. | |
| 5,483,927 A | 1/1996 | Letang et al. | |
| 5,521,809 A | * 5/1996 | Ashley et al. | ............ 363/71 |
| 5,615,654 A | 4/1997 | Weisman, II et al. | |
| 5,640,060 A | 6/1997 | Dickson | |
| 5,732,676 A | 3/1998 | Weisman et al. | |
| 5,751,532 A | 5/1998 | Kanuchok et al. | |
| 5,754,033 A | 5/1998 | Thomson | |
| 5,844,383 A | * 12/1998 | Denaci | ............ 318/139 |
| 5,847,644 A | 12/1998 | Weisman, II et al. | |
| 5,886,504 A | 3/1999 | Scott et al. | |
| 5,938,716 A | 8/1999 | Shutty et al. | |
| 5,999,876 A | 12/1999 | Irons et al. | |
| 6,018,200 A | 1/2000 | Anderson et al. | |
| 6,166,455 A | * 12/2000 | Li | ............ 307/43 |
| 6,172,885 B1 | * 1/2001 | Feldtkeller | ............ 363/21 |
| 6,188,203 B1 | * 2/2001 | Rice et al. | ............ 322/25 |
| 6,208,497 B1 | * 3/2001 | Seale et al. | ............ 361/160 |

FOREIGN PATENT DOCUMENTS

| | | | | |
|---|---|---|---|---|
| JP | 404000907 A | * | 1/1992 | |
| JP | 404000907 A | * | 1/1992 | ............ 330/282 |

OTHER PUBLICATIONS

Adel S. Sedra, Kenneth C. Smitch, Microelectronic Circuits, Fourth Edition; 1998, Oxford University Press, pp. 667–670, 701–713.*

(List continued on next page.)

Primary Examiner—Dang Le
Assistant Examiner—Julio Gonzalez Ramirez
(74) Attorney, Agent, or Firm—Quarles & Brady LLP

(57) ABSTRACT

A system and method for sensing alternator current levels are disclosed. The system includes the combination including an operational amplifier having an input and an output, an input resistor connecting the input to a signal indicative of an alternator current level, and a feedback resistor connected between the input and the output. The system further includes an adjustment resistor and a switching element coupled in series between the input and the output, in parallel with the feedback resistor, and a processor coupled to the output. The processor is operable, based upon a current indication related to a level of alternator current indicated at the output, to control the operation of the switching element such that the switching element is closed when the current indication increases to exceed a first threshold, and such that the switching element is opened when the current indication decreases to fall below a second threshold.

21 Claims, 5 Drawing Sheets

OTHER PUBLICATIONS

Protective Relaying Principles and Applications, 2d ed., J. Lewis Blackburn, pp. 248–249, 312–315, and 370–371, 1998.

BE1–50/51B Time Overcurrent Relay, Basler Electric, 5 pages, 6–92 and 7–96.

Generator Protection, Ch. 11, ANSI/IEEE Std 242–1986, pp. 441–451, and 470–471.

Kohler Power Systems literature: form G12–197, 6/96; form G6–34, 2/97; from G11–63, 10/95; form G11–56, 6/94; form G6–35, 3/98; and form TIB–102, 11/97.

System Coordination With Fast–Response Generators, Gordon S. Johnson, Kohler Co., Generator Division, 1983.

* cited by examiner

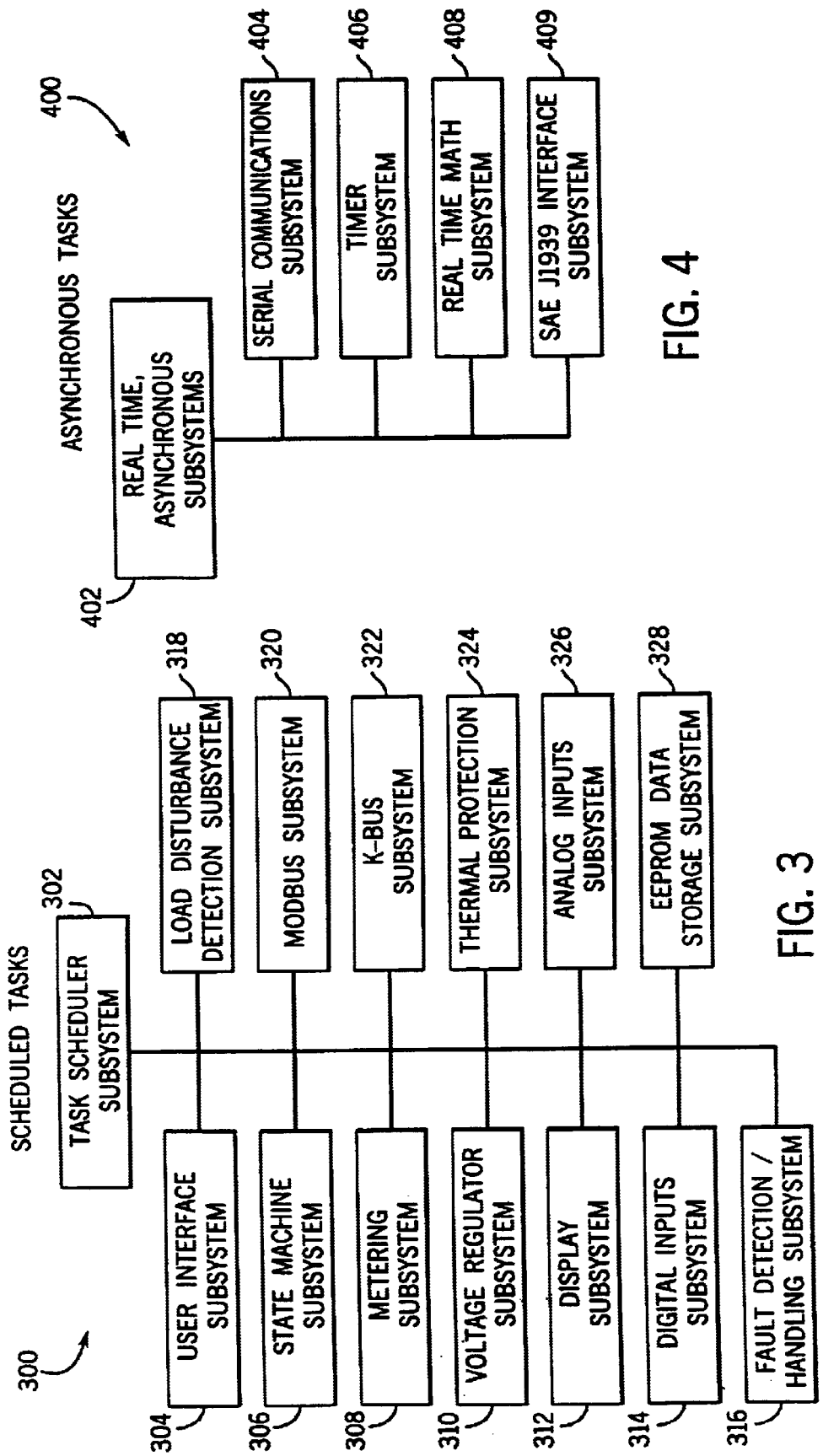

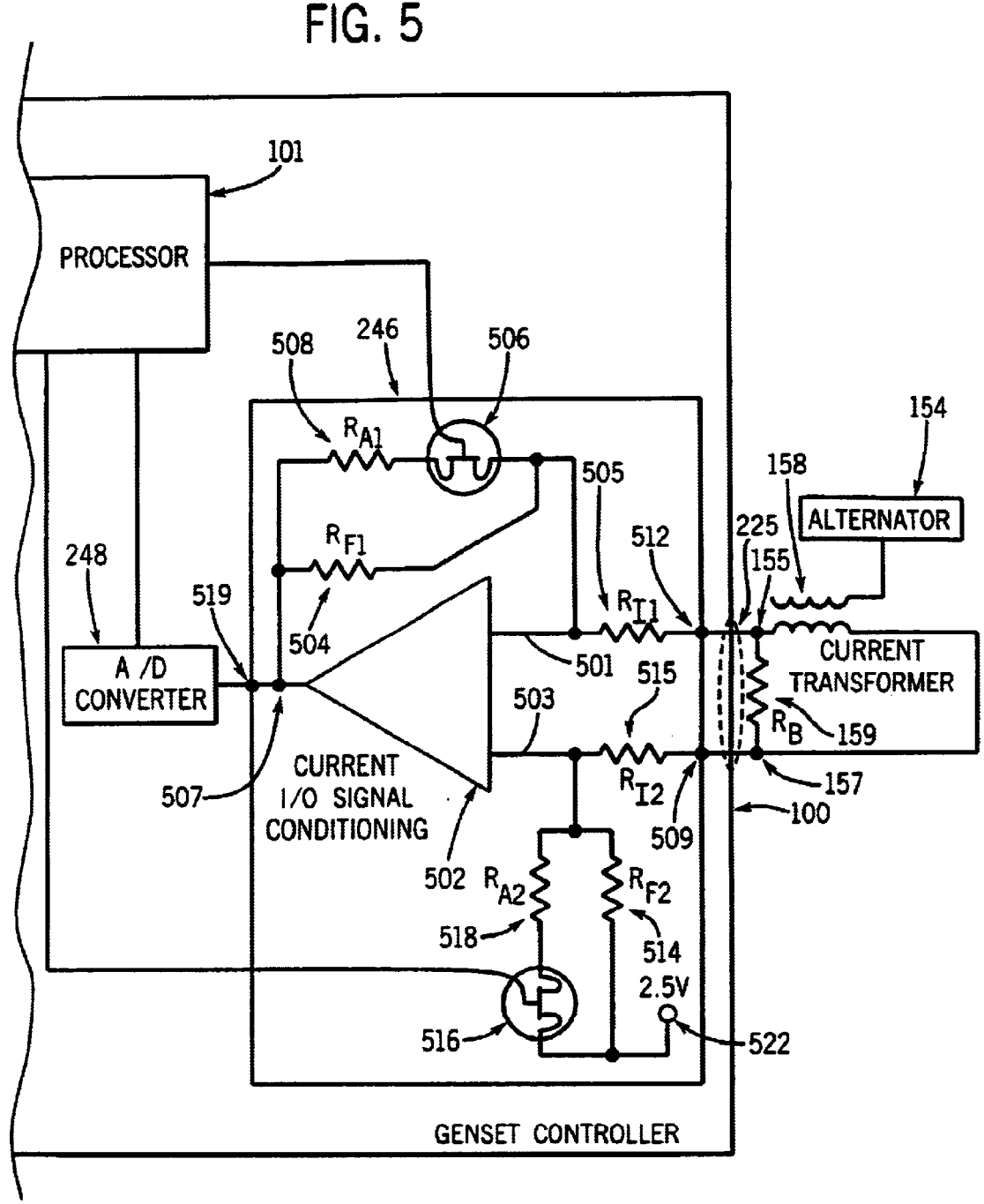

METHOD AND APPARATUS FOR SENSING VARIABLE CURRENTS WITHIN THE ALTERNATOR OF A GENSET THAT EMPLOYS AN AMPLIFIER AND A SWITCHED FEEDBACK RESISTANCE

FIELD OF THE INVENTION

The present invention relates to the control and monitoring of an electric generator set including an engine and an alternator particular, the present invention relates to the sensing by a genset controller of one or more currents flowing within the alternator.

BACKGROUND OF THE INVENTION

Electric generator sets (or "gensets") are widely used to provide electric power. A genset typically includes an engine coupled to an alternator, which converts the rotational energy from the engine into electrical energy. The terminal voltage of a genset is proportional to both the magnetic flux density within the alternator, and the speed of the engine. The magnetic flux density is typically determined by controlling an armature voltage or field current on the alternator, while the speed of the engine is typically determined by an engine governor.

It is known to control the operation of a genset with a genset controller. A new invention in the controlling of gensets relating to a thermal protection subroutine is described in a related patent application filed on the same date herewith, entitled "METHOD AND APPARATUS FOR PREVENTING EXCESSIVE HEAT GENERATION IN AN ALTERNATOR OF A GENERATOR SET", which is hereby incorporated herein by reference. In accordance with this invention, the currents flowing within an alternator of a genset are monitored in order to determine whether the currents are excessive, such that excessive heat exposure and damage to the alternator could result, and the genset controller causes the currents within the alternator to be reduced if they are becoming too great. This is in contrast to many conventional systems that lack such a feature as part of the genset controller, and in which the genset itself is required to have a circuit breaker to prevent excessive currents in the alternator.

In order for a genset controller to provide effective control of the currents of an alternator to preclude excessive heat exposure, the genset controller must be capable of measuring the currents within the alternator. In particular, the genset controller must be able to measure the currents both when they are within or close to the rated current level, as well as when they are significantly higher than the rated current level, or even an order of magnitude (i.e., 10 times) greater than the rated current level. This is not possible for conventional genset controllers, since such controllers are only capable of measuring currents within a given range, e.g., 0 to 150% of the rated current.

Further, although the genset controller must be able to measure currents that are both below the rated current level and also very high above the rated current level, the genset controller must still be able to obtain measurements of the currents that are accurate, particularly when those currents are at or near the rated current level. Without such accurate measurements, the genset controller lacks a reliable basis for determining whether the currents within the alternator are truly excessive, and for determining what are the appropriate control signals to provide feedback to the genset. Yet, if a conventional genset controller was tailored to be able to measure currents of up to an order of magnitude greater than the rated current level of an alternator, the conventional genset controller would then lack sufficient accuracy in measuring low-level currents at or near the rated current level.

It would therefore be advantageous if a new method and apparatus were developed for sensing the currents within an alternator even when those currents varied over a wide range. It would particularly be advantageous if the method and apparatus allowed for the sensing of currents that were both less than the rated current level and also currents that were substantially higher than the rated current, e.g., within an order of magnitude of the rated current. It would further be advantageous if the method and apparatus maintained highly accurate sensing capabilities for currents at or near the rated current level even though the method and apparatus allowed sensing of the currents that were much higher than the rated current level. It would additionally be advantageous if the method and apparatus could be implemented for sensing such a wide range of currents with a minimum of circuit elements and/or software, and was relatively inexpensive and simple to implement on a genset controller.

SUMMARY OF THE INVENTION

The present inventors have discovered that it is possible to provide in a genset controller a multiplicative gain switching device within a voltage signal conditioning unit, which both allows for the sensing of voltages representative of alternator currents at or near the rated current level when switched to a first position, and also allows for the sensing of voltages representative of alternator currents up to an order of magnitude (10 times) greater than the rated current level when switched to a second position. Through the use of this multiplicative gain switching device and certain additional limited software programming, a wide range of current values can be sensed accurately, especially at the lower current levels, without requiring significant numbers of additional or specialized circuit elements.

In one embodiment of the invention, the multiplicative gain switching device operates so that an adjustment resistor is coupled in parallel with an existing feedback resistor within a differential amplifier when alternator currents are increasing above a first threshold near the rated current level. This decreases the gain of the differential amplifier. Further, the multiplicative gain switching device also operates so that the adjustment resistor is decoupled from the feedback resistor when alternator currents are decreasing below a second threshold also near the rated current level. This increases the gain of the differential amplifier. Thus, by switching on and off the switching device and thereby switching the adjustment resistor on and off, the gain of the differential amplifier is varied to account for the changes in the alternator currents.

When the adjustment resistor is coupled in parallel to the existing feedback resistor, the genset controller is configured to switch in its operation to a high current algorithm, which takes into account the low amplification of the differential amplifier. Similarly, when the adjustment resistor is no longer in parallel with the existing feedback resistor, the genset controller is configured to operate using a low current algorithm to take into account the high amplification of the differential amplifier. Consequently, the genset controller is able to sense low current levels at or near the rated current level with great accuracy due in part to the high gain on the differential amplifier, and is also able to sense high current levels up to an order of magnitude greater than the rated current level using effectively the same circuitry by reducing the gain on the differential amplifier.

In particular, the present invention relates to a system for sensing alternator current levels. The system includes the combination including an operational amplifier having an input and an output, an input resistor connecting the input to a signal indicative of an alternator current level, and a feedback resistor connected between the input and the output. The system further includes an adjustment resistor and a switching element coupled in series between the input and the output, in parallel with the feedback resistor, and a processor coupled to the output. The processor is operable, based upon a current indication related to a level of alternator current indicated at the output, to control the operation of the switching element such that the switching element is closed when the current indication increases to exceed a first threshold, and such that the switching element is opened when the current indication decreases to fall below a second threshold.

The present invention further relates to a system for accurately sensing current levels within an alternator. The system includes an amplification means for amplifying or reducing a first signal indicative of a current level within the alternator to produce a second signal indicative of the current level, and a modification means for adjusting the level of amplification or reduction of the amplification means. The system additionally includes a processing means for controlling the modification means and for processing at least one of the second signal and a third signal based upon the second signal to determine a current measurement value.

The present invention additionally relates to a method of accurately sensing current levels within an alternator. The method includes providing a differential amplifier configured to receive a first indication of a current level within the alternator at a first input port and to provide a second indication of the current level at an output port. The method further includes providing a processor in communication with a switching element of the differential amplifier and the output port, receiving the first indication of the current level, and determining at the processor at least two measured current values based upon the second indication. The method additionally includes switching a status of the switching element to reduce a gain of the differential amplifier when the measured current values increase from being below a first threshold to exceed the first threshold, and switching the status of the switching element to increase the gain of the differential amplifier when the measured current values fall from above a second threshold to below the second threshold.

BRIEF DESCRIPTION OF THE DRAWINGS

FIG. 3 is a detailed block diagram of synchronous software tasks that are performable by the genset controller of FIG. 1;

FIG. 4 is a detailed block diagram of asynchronous software tasks that are performable by the genset controller of FIG. 1;

FIG. 5 is a block diagram showing the alternator and current transformer, as well as a portion of the genset controller, of FIG. 1, in accordance with one embodiment of the present invention.

DETAILED DESCRIPTION OF THE PREFERRED EMBODIMENT

Figure 1:
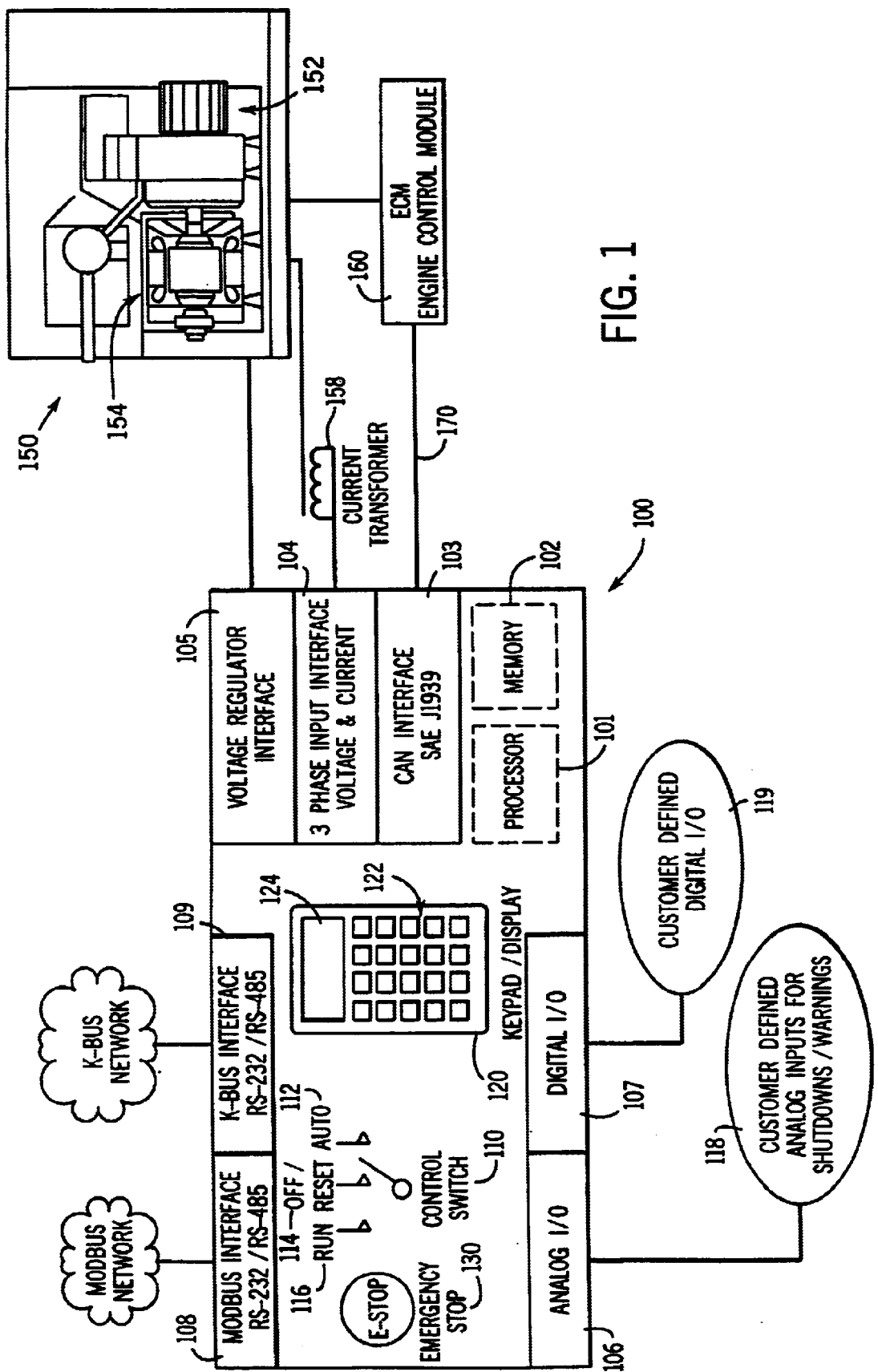
FIG. 1 is a block diagram showing a genset including an alternator, an engine control module, a current transformer, and a genset controller that is capable of sensing variable output currents of the alternator.

Referring to FIG. 1, a generator set controller (or genset controller) 100 is shown coupled to a generator set (genset) 150. Genset controller 100 can be located remotely from genset 150 (up to 40 feet) or attached to the genset directly by way of an engine harness. Genset 150 includes an engine 152 and an alternator (or synchronous generator) 154, and has a typical power rating of between 20 KW and 2000 KW or more. Engine 152 is typically an internal combustion engine that is powered by gasoline, diesel fuel, methane gas or other fuels, for example, the Series 60, Series 2000 or Series 4000 engines manufactured by Detroit Diesel Company of Detroit, Mich. Engine 152 rotates a rotor (not shown) of alternator 154, which outputs electrical power. Alternator 154 is typically a three-phase machine, such as the Model 5M4027 alternator manufactured by Marathon Electric Company.

Figure 2:
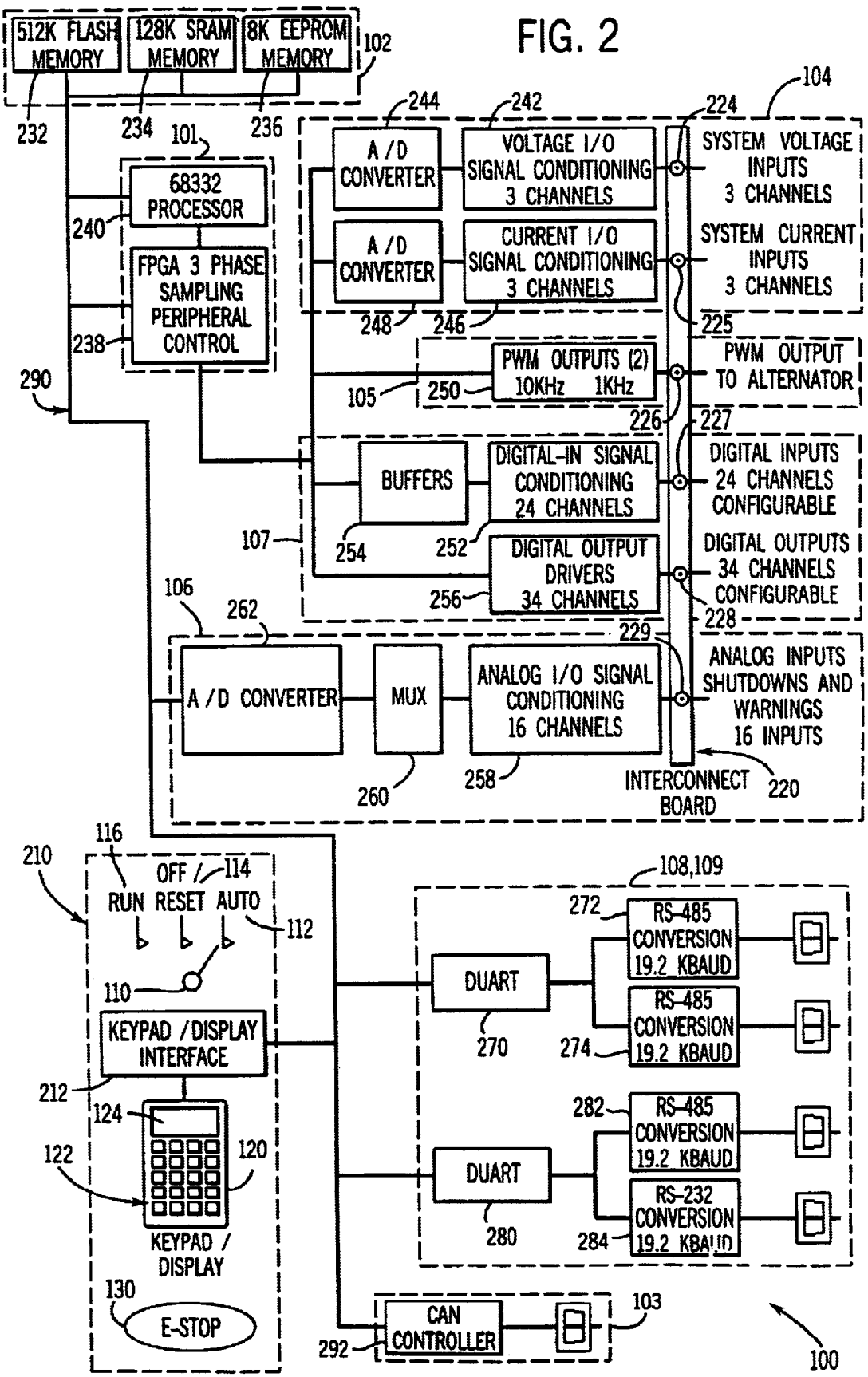
FIG. 2 is a detailed block diagram of the genset controller of FIG. 1.

Genset controller 100 operates to control and monitor the operation of genset 150. As shown in FIGS. 1 and 2, genset controller 100 is a microprocessor-based (or otherwise computer-driven) system having a processor 101 and a memory 102. Referring to FIG. 2, memory 102 includes a 512K FLASH memory 232, a 128K SRAM memory 234, and an 8K EEPROM memory 236. Processor 101 includes a microcontroller or microprocessor 240 (e.g., a MC68332 processor manufactured by Motorola, Inc. of Schaumburg, Ill.), and also a field-programmable gate array (FPGA) 238. FPGA 238 allows for memory allocation among memories 232–236. Processor 101 and memory 102 are coupled to one another and other elements of the genset controller 100 by an internal bus structure 290.

Genset controller 100 employs several interfaces to provide control and monitoring of genset 150, including a CAN interface 103, a three-phase input interface 104, a voltage regulator interface 105, an analog input/output interface (analog I/O) 106 and a digital input/output interface (digital I/O) 107. Three-phase input interface 104, voltage regulator interface 105 and digital I/O 107 each are coupled directly to FPGA 238 of processor 101, which allows for signal sampling, signal multiplexing, and control of peripheral devices (such as operator interface devices, discussed below). CAN interface 103 and analog I/O 106 are coupled to processor 101 by way of internal bus 290. Input and output ports for each of interfaces 104–107 are provided on an interconnect board 220 of genset controller 100.

The processor 240 operates under the direction of stored program instructions to read in information through the three-phase input interface 104 regarding the operation of the alternator 154 in the genset 150. Referring to FIGS. 1 and 2, the three-phase alternator output voltages are applied to system voltage inputs 224, and the three-phase alternator output currents are coupled through a current transformer 158 to system current inputs 225. These six analog input signals are filtered by respective voltage and current conditioning circuits 242 and 246 and are digitized by respective voltage and current analog-to-digital converters 244 and 248. These digitized indications of alternator output voltages and currents are read by the processor 240 and used to monitor genset performance. This information may be displayed and it may be used to calculate other genset operating parameters, such as output power, reactive power, power factor and alternator duty level and frequency.

The digitized alternator output signals are also used as the basis for controlling the operation of the alternator 154. As will be described below, the processor 101 is programmed to provide command signals to the voltage regulator interface 105. These commands operate a pulse width modulation (PWM) unit 250 which outputs pulse-width modulated signals to PWM output 226 of interconnect board 220. These PWM signals are applied to alternator 154 to control the voltage, current, and power output levels of the alternator. In particular, voltage regulator interface 105 provides an approximately 10 KHz PWM signal to adjust the field current on alternator 154 to control the armature voltage and maintain the output voltage at a particular level. The voltage regulator interface 105 may also provide a 1 KHz PWM signal for governing engine speed 152, if an ECM is not employed.

In addition to providing control and monitoring of alternator 154, genset controller 100 also provides control and monitoring of engine 152. Although in certain embodiments genset controller 100 directly controls engine 152, in the preferred embodiment genset controller 100 does not directly control the engine. Rather, the operation of engine 152 is directly controlled by an engine control module (ECM) 160, which typically is physically attached to the engine. ECM 160 can control engine speed (and other engine operating parameters), and thereby control the output power of alternator 154. ECM 160 also monitors a variety of engine characteristics, for example, fuel consumption, oil pressure, emissions levels, coolant temperature, time delay engine cool down information, and time delay engine start information.

The genset controller 100 controls and monitors the ECM 160 through CAN interface 103 which connects to the CAN serial link 170. CAN serial link 170, employs the SAE J1939 protocol which is an industry standard protocol for serial communications. By way of CAN databus 170, genset controller 100 receives the information about the operation of engine 152 that has been collected by ECM 160, and provides commands to the ECM 160 to influence the operation of the engine. In particular, upon determining the occurrence of system faults, genset controller 100 provides commands to engine 152 via ECM 160 causing the engine to shutdown, by turning off both the ignition and the cranking of the engine.

The genset controller 100 includes analog I/O 106 and digital I/O 107 which enable it to communicate with a variety of devices. The analog I/O 106 receives up to eight separate analog input signals at inputs 229 on interconnect board 220. These analog signals are filtered by conditioning circuit 258, and applied to an A/D converter 262 through a multiplexer 260. The processor 101 can thus sequentially scan the analog inputs and read in digitized signals indicative of engine parameters such as engine temperature, gas emissions and engine battery charge.

The digital I/O 107 receives 24 single-bit TTL signals at digital inputs 227, and produces 34 single-bit TTL signals at digital outputs 228 on interconnect board 220. Digital inputs 227 are coupled to a digital input signal conditioning unit 252, which conditions the input signals and provides the signals to FPGA 238 via buffers 254. Three of the inputs 227 are dedicated to signals relating to emergency stopping, remote starting, and low coolant level of genset 150. The remaining inputs are definable inputs, which can be enabled or disabled, and are coupled to a variety of discrete sensors. The discrete sensors are capable of indicating various types of engine characteristics, warning conditions, and system faults relating to low fuel, or high oil temperature, as well as switch gear conditions concerning the synchronization of the power output of genset 150 with power lines to which the genset is being connected.

Genset controller 100 is capable of performing a variety of functions in response to the signals received at analog inputs 229 and digital inputs 227. In particular, genset controller 100 is capable of scaling the signals, monitoring genset parameters through the use of the signals, detecting system faults, and providing system warnings or system shutdowns in response to the signals. As will be discussed in more detail below, genset controller 100 is also capable of displaying (in real-time) information obtained from the signals, providing relay driver outputs (RDOs) in response to the signals, and relaying information in the signals to remote control and monitoring stations.

The 34 digital outputs 228 are driven by digital output drivers 256. The digital outputs 228 are controlled by the processor acting through FPGA 238. Three digital outputs are dedicated to a Controller Panel Lamp Relay, a Controller Engine Crank Relay, and a Controller Engine Fuel Relay. The remaining digital outputs are definable, and typically are RDOs that determine the on/off status of a variety of indication/warning lamps within a remote control station. The definitions of these digital outputs typically correspond to particular system warnings, shutdowns or other conditions. For example, the definable digital outputs can be RDOs corresponding to "NFPA-110" functions such as overspeed, overcranking, low oil pressure, or high coolant temperature of engine 152. The definable digital outputs can also be RDOs corresponding to loss of signal functions, including a loss of communications with ECM 160. Additionally, the definable digital outputs can be RDOs corresponding to one of many system fault conditions concerning the genset 150 or the genset controller 100 itself.

As shown in FIGS. 1 and 2, genset controller 100 also includes a number of operator interface devices, by which an operator can both provide commands to the genset controller and receive information from the genset controller. The operator interface devices are included on a front panel Man Machine Interface (MMI) 210, which is situated on a controller box. One of the operator interface devices is an emergency stop button 130. Emergency stop button 130 allows an operator to immediately stop the genset 150 by pressing a pushbutton.

A second operator interface device is a keypad/display 120, which includes 16 individual keypads 122 and a vacuum flourescent display (VFD) 124. Keypad/display 120 is coupled to a keypad/display interface 212 in front panel MMI 210, which in turn is coupled to internal databus 290. Keypads 122 allow an operator to enter a variety of information and commands to genset controller 100. VFD 124 is an alphanumeric display, and allows genset controller 100 to display various information concerning system operation and system faults to an operator. A VFD is employed because it provides good visibility over a large range of temperatures and from a wide range of viewing angles.

The operator interface devices further include a control switch 110, which can be rotatably set to one of three positions: an Automatic (Auto) position 112; an Off/Reset position 114; and a Run position 116. Setting the control switch to Run position 116 causes genset controller 100 to send a signal via ECM 160 to start and run the genset 150. Setting control switch 110 to Auto position 112 allows the genset 150 to be started and controlled from a remote location. This mode of operation also allows for time-delayed engine starting and cool-down. Setting control switch 110 to Off/Reset position 114 initiates the immediate shutdown of genset 150 and also results in a resetting of the software of genset controller 100. If a fault occurs that precipitates a system shutdown, an operator must move control switch 110 to Off/Reset position 114 to clear the fault before genset 150 can be started again.

Genset controller 100 also includes other devices which provide information to an operator, including several light-emitting diodes(LEDs) and an alarm horn (not shown). These devices are used to provide system status information to an operator, as well as to alert the operator to the existence of system faults. During the occurrence of some faults, a message concerning the fault or related warning/shutdown condition is displayed on VFD 124, an appropriate warning LED on front panel MMI 210 is turned on, the alarm horn is activated, and a corresponding RDO is produced at a digital output 228.

As shown in FIG. 1, genset controller 100 is capable of communication with other remote control and monitoring devices via both a K-BUS interface 109 and a second serial interface 108. K-BUS interface 109 provides serial communications using the proprietary K-BUS serial communications protocol. Second serial interface 108 provides serial communications using any of a variety of other "open" serial communications protocols, including the Modbus™ protocol. Each of K-BUS interface 109 and second serial interface 108 is configurable to use either the RS-232 or RS-485 standards.

In the preferred embodiment shown in FIG. 2, the structures associated with K-BUS interface 109 and second serial interface 108 include a first dual universal asynchronous receiver/transmitter (DUART) 270 that is coupled to two RS-485 conversion units 272 and 274, and a second DUART 280 that is coupled to an RS-485 conversion unit 282 and an RS-232 conversion unit 284. Each of DUARTs 270, 280 is coupled to internal databus 290 and is controlled in response to program instructions executed by microcomputer 240.

The microprocessor 240 operates the genset under the direction of programs illustrated in FIGS. 3 and 4. The programs include scheduled tasks which, as illustrated in FIG. 3, are performed one at a time under the direction of a task scheduler program 302. The programs also include asynchronous tasks as illustrated in FIG. 4. The asynchronous tasks are performed in response to interrupts that are managed by a real time, asynchronous program 402.

Referring to FIGS. 3 and 4, two block diagrams 300, 400 are provided showing software based subsystems (or tasks) that are performed by microprocessor 240 of genset controller 100. Through the operation of these subsystems, microprocessor 240 is capable of monitoring genset 150 (as well as capable of monitoring the operation of genset controller 100), receiving operator commands, detecting system faults, providing system warnings and shutdowns when necessary, displaying information at keypad/interface 120 (and at other operator interface devices), and conducting communications with genset 150, ECM 160 and other devices via K-BUS interface 108 and second serial interface 109. The subsystems of block diagrams 300, 400 are self-contained routines that control specific aspects of genset controller 100. Each subsystem is an independent, modular unit with well-defined input/output protocols to communicate with other subsystems.

Block diagram 300 shows scheduled subsystems, which are scheduled according to a task scheduler subsystem 302. The task scheduler subsystem is capable of invoking any subsystem at a rate of up to 100 times a second, and is able to handle transitions between subsystems and to monitor the execution times of subsystems to make sure that subsystems do not exceed their time allotments. As shown, other scheduled subsystems (which are scheduled by task scheduler subsystem 302) include a user interface subsystem 304, a state machine subsystem 306, a metering subsystem 308, a voltage regulator subsystem 310, a display subsystem 312, a digital inputs subsystem 314, and a fault detection/handling subsystem 316. Further, the scheduled subsystems include a load disturbance detection subsystem 318, a Modbus™ (or other serial communications) subsystem 320, a K-BUS subsystem 322, a thermal protection subsystem 324, an analog inputs subsystem 326, and an EEPROM data storage subsystem 328.

Block diagram 400 shows asynchronous subsystems. As shown in block 402, these subsystems operate in real time, asynchronously, with respect to the scheduled subsystems (i.e., operate in the "background" of the scheduled subsystems). The asynchronous subsystems also provide data when the scheduled subsystems require such data. The asynchronous subsystems are interrupt-driven modules and can take advantage of special features of microprocessor 240 (such as the embedded time processing unit within the microprocessor). The asynchronous subsystems include a serial communications subsystem 404, a timer subsystem 406, a real time math subsystem 408 (which employs a time processing unit of microprocessor 240), and a SAE J1939 interface subsystem 409.

Referring to FIG. 5, elements of the genset controller 100 that allow for sensing of both low currents of the alternator 154 that are at or near a rated current level, as well as high currents up to an order of magnitude greater than the rated current level are shown. The genset controller 100 is shown to be coupled to the alternator 154 by way of the current transformer 158 at system current input 225. The signal from current transformer 158 is provided through system current input 225 to the current conditioning circuit 246 which in turn is coupled to analog-to-digital converter 248.

Current conditioning circuit 246 is, in this embodiment, a differential amplifier including an operational amplifier 502. A first input resistor 505 ($R_{I1}$) is coupled between a first input port 501 of the operational amplifier 502 and a first input port 512 of the current conditioning circuit 246, which is coupled to a first terminal 155 of the current transformer 158 by way of the system current input 225. The signal input via system current input 225 from terminal 155 is thus provided to the first input port 501 of the operational amplifier 502 by way of the input resistor 505.

A second input resistor 515 ($R_{I2}$) is similarly coupled between a second input port 503 of the operational amplifier 502 and a second input port 509 of the current conditioning circuit 246, which is coupled to a second terminal 157 of the current transformer 158 by way of the system current input 225. A burden resistor 159 ($R_B$) is coupled between the two terminals 155,157 of the current transformer to provide a return path for current between terminals 155,157. An output port 507 of the operational amplifier 502 is provided to the analog-to-digital converter 248. The output port 507 is coupled to an output port 519 of the current conditioning circuit 246.

Coupled between the first input port and the output port 507 is a first feedback resistor 504 ($R_{F1}$), in parallel with the series combination of a switching element 506 such as a MOSFET (metal oxide semi-conductor field effect transistor)and an adjustment resistor 508 ($R_{A1}$). In alternate embodiments, other switching devices such as a bipolar junction transistor can be employed instead of the MOSFET. The adjustment resistor 508 is coupled in parallel with the feedback resistor 504 when the switching element 506 is turned on, but only the feedback resistor is coupled between the output port 507 and the first input port 501 when the switching element 506 is turned off. The switching element 506 is shown to be coupled directly to, and controlled directly by, the processor 101, although the controlling of the switching element can in alternate embodiments be performed in other ways. The processor 101 is also coupled to the analog-to-digital converter 248, which provides the processor with digital signals corresponding to the output of the current conditioning circuit 246.

The current conditioning circuit 246 amplifies the input signal from the current transformer 158 as a conventional differential amplifier. Thus, when the adjustment resistor 508 is not coupled between the first input port 501 and the output port 507 due to the switching element 506 being turned off, the voltage gain experienced between the input port 512 and the output port 519 of the current conditioning circuit 246 is proportional to the ratio of the resistance of the feedback resistor 504 to the resistance of the input resistor 505 (e.g., $R_{F1}/R_I$). However, when the adjustment resistor 508 is coupled in parallel with the feedback resistor 504 because the switching element 506 is turned on, the gain of the differential amplifier is proportional to the ratio of the parallel combination of the resistances of the feedback resistor and the adjustment resistor to the resistance of the input resistor 505 $\{R_{A1}R_{F1}/[(R_{A1}+R_{F1})R_I]\}$. Thus, by turning on the switching element 506, the gain of the differential amplifier can be reduced. Further, by appropriately choosing the ratio of $R_{A1}$ to $R_{F1}$, the gain of the differential amplifier can be reduced by a factor of 10 when the switching element 506 is turned on, in particular.

The embodiment shown in FIG. 5 further includes a second feedback resistor 514 ($R_{F2}$) coupled between the second input port 503 and a 2.5 Volt DC voltage source 522. Coupled in parallel with the second feedback resistor 514 is a second adjustment resistor 518 ($R_{A2}$) in series with a second switching element 516. The operation of the second switching element 516 is also determined by the processor 101, to which the second switching element 516 is coupled. In the embodiment shown, the resistance values of the first and second feedback resistors 504,514 are the same, the resistance values of the first and second adjustment resistors 508,518 are the same, the resistance values of the first and second input resistors 505,515 are the same, and the type and characteristics of both switching elements 506,516 are the same. Additionally, the two switching elements 506,516 are switched on and off at the same times so that, when the first switching element 506 is turned on, the second switching element 516 is turned on to cause the resistance between the voltage source 522 and the second input port 503 to be reduced from that of the second feedback resistor 514 alone to that of the parallel combination of the second feedback and adjustment resistors 514,518.

Without the second feedback and adjustment resistors 514,518 and the second switching element 516, the voltage output at port 519 would tend to zero volts for a zero volt differential applied between ports 512 and 509; however, with the second feedback and adjustment resistors and the second switching element the voltage output is biased to 2.5 Volts. By including the second feedback and adjustment resistors 514,518 and second switching element 516, therefore, the output of the differential amplifier is biased to a point above the noise level, and the analog-to-digital converter 248 can be provided power by way of a single positive power supply, instead of requiring both positive and negative power supplies (to handle positive and negative outputs from the differential amplifier. Use of pairs of feedback, adjustment, and input resistors having the same values allows for balanced operation of the differential amplifier.

A variety of alternate embodiments are possible for the current conditioning circuit 246. For example, the differential amplifier shown in FIG. 5 can be modified to not include the second feedback and adjustment resistors 514,518 or the second switching element 516 (or the voltage source 522), and to couple the second input port 503 to ground. In such an embodiment, the output voltage of the differential amplifier would be biased at zero volts, such that the analog-to-digital converter 248 would require both positive and negative power supplies and possibly additional filtering.

In another alternate embodiment, the series combination of the first adjustment resistor 508 and first switching element 506 is replaced with the parallel combination of those two devices, which in turn is coupled in series with the first feedback resistor 504. In such an embodiment, the gain of the differential amplifier is increased by turning off the first switching element 506, which increases the resistance between the first input port 501 and the output port 507 of the operational amplifier 502. Similar changes could be made with respect to the second adjustment resistor 518, the second feedback resistor 514 and the second switching element 516. In further alternate embodiments, other circuits having a gain that can be modified can be utilized in place of the differential amplifier of the current conditioning circuit 246.

Figure 6:
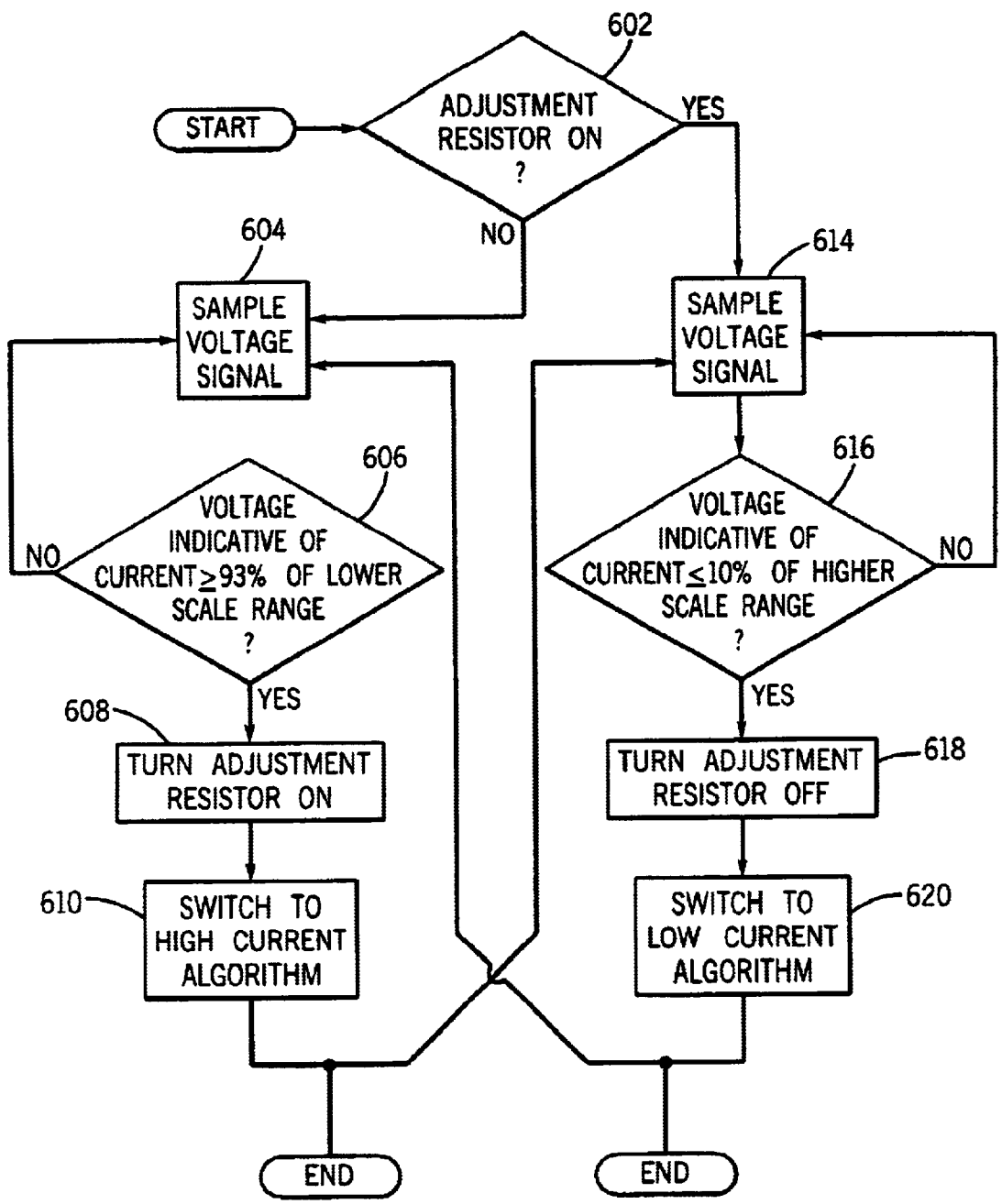
FIG. 6 is a flow chart showing exemplary steps of a method of sensing variable output currents of an alternator through the use of the genset controller of FIGS. 1 and 5.

Turning to FIG. 6, a flow chart with exemplary steps of operation of the genset controller 100 are shown. The steps of the flow chart allow the genset controller 100 to sense a variety of output currents of the alternator 154 ranging from output currents at or near a rated current level to currents that are up to an order of magnitude greater than the rated current level. In the present embodiment, these steps are performed by the microprocessor 240 as part of the metering subsystem 308 of the scheduled tasks 300 of the genset controller; however, in alternate embodiments, different software programs are employed to perform these or similar steps, or these steps are executed by hardwired circuitry.

As shown, upon starting operation, it is known whether the adjustment resistor 508 is coupled in parallel with the feedback resistor 504 because the switching element 506 is turned on such that the adjustment resistor is "on," at step 602. If the adjustment resistor 508 is not on, the genset controller 100 is currently expecting to sense current levels that are at or near the rated current level, and is operating in a lower current scale range. At step 604, the genset controller 100 obtains a sample current signal indicative of the measured current when the differential amplifier of current conditioning circuit 246 provides an output to the analog-to-digital converter 248, which in turn provides a digital signal to the processor 101.

If the sample current is indicative of a current being output by the alternator 154 that is greater than or equal to 93% percent of the lower scale range, this means that the initial assumption that the current output from the alternator 154 was at or near the rated current level was incorrect. Rather, the current being output by the alternator 154 is at a high level. In order to measure this high level of current, the gain of the differential amplifier of the current conditioning circuit 246 must be reduced. Consequently, the processor 101 causes the switching status of the switching element 506 to change in order to turn on the adjustment resistor 508, at step 608, which reduces the overall resistance between the output port 507 and the first input port 501 and therefore reduces the gain of the differential amplifier. At step 610, the processor 101 additionally switches its software routine to a high current algorithm, which takes into account the adjusted gain of the differential amplifier and determines current values in a higher scale range. The higher scale range is defined relative to the lower scale range such that a particular level on the higher scale range is equal to ten times that level on the lower scale range; for example, a level of 10% of the higher scale range corresponds to 100% on the lower scale range.

The processor 101 then proceeds to step 614, at which it again samples the current signal output by the current conditioning circuit 246. If, at step 616, the current signal is indicative of a current that is above 10 percent of the higher scale range, the genset controller 100 maintains the present status of the switching element 506 and the software routine, and continues to sample the current signal at step 614. However, if at step 616 the current is indicative of a current level of the alternator 154 that is less than or equal to 10 percent of the higher scale range, the genset controller 100 proceeds to step 618, at which the adjustment resistor 508 is turned off, i.e., the switching element 506 is caused to become an open circuit.

Consequently, the gain of the differential amplifier is increased again, corresponding to the return of the output current levels of the alternator 154 to levels that are at or near the rated current level. In addition to turning the adjustment resistor 508 off at step 618, the processor 101 also switches its software routine to the low current algorithm 620, which takes into account the increased gain of the current conditioning circuit 246 in determining the actual current output by the alternator 154. The system then returns to step 604 and again samples the current signal output by the current conditioning circuit 246.

In the embodiment shown, the current level at which the processor 101 turns the adjustment resistor 508 on differs from the current level at which the processor turns the adjustment resistor 508 off. This is to provide some hysteresis to the system so that if the current levels output by the alternator 154 hover near the rated current level, the system does not need to repeatedly switch the adjustment resistor on and off and switch the software routine execution correspondingly. Thus, once the adjustment resistor 508 is turned off, the system continues to cycle through steps 604 and 606 repeatedly until the current increases to a level indicative of a current that is greater than or equal to 93 percent of the lower scale range; likewise, once the adjustment resistor 508 has been turned on, the system continues to cycle between steps 614 and 616 until the current level becomes indicative of a current level that is less than or equal to 10 percent of the higher scale range.

In the present embodiment steps 608 and 618 are performed before steps 610 and 620, respectively; however, in alternate embodiments, the order of the steps can be reversed. In certain embodiments, steps 608 and 610 are performed simultaneously with steps 618 and 620, respectively. The exact changes to the software subroutines executed by the processor 101 that occur upon the execution of steps 610 and 620 can vary depending on the embodiment. However, in one embodiment, the processor 101 calculates measured current values based upon the output of the current conditioning circuit 246 where the formulas for determining these measured currents include multiplication of preliminary results by factors corresponding to the gain of the differential amplifier, and the sole change in the formulas during the execution of steps 610 or 620 is a change in these factors to account for the change in gain. As shown in FIG. 6, the execution of the steps of FIG. 6 can end upon the completion of, for example, either step 610 or step 620.

Important to the operation of the present embodiment of the invention is the employment of an accurate current transformer 158 with a large range of operation. In particular, the current transformer 158 must have a current sensing capability of ten times the rated current level that the alternator would be expected to conduct during operation. Further, the current transformer 158 must have particularly high accuracy at the low current values near the rated current level, and need not be quite as accurate at the high current levels. As a consequence of the present invention, the genset controller 100 can sense current up to ten times the rated current level, but still maintain a very high accuracy of current sensing under normal operating conditions where the current is at or near the rated current level.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. For example, in certain alternate embodiments, voltage signals are employed to represent current levels within the alternator. Accordingly, reference should be made to the following claims, rather than to the foregoing specification, as indicating the scope of the invention.

What is claimed is:

1. A system for sensing alternator current levels, the combination comprising:
   an operational amplifier having an input and an output;
   an input resistor connecting the input to a signal indicative of an alternator current level;
   a feedback resistor connected between the input and the output;
   an adjustment resistor and a switching element coupled in series between the input and the output, in parallel with the feedback resistor; and
   a processor coupled to the output and being operable, based upon a current indication related to a level of alternator current indicated at the output, to control the operation of the switching element such that the switching element is closed when the current indication increases to exceed a first threshold, and such that the switching element is opened when the current indication decreases to fall below a second threshold, wherein the signal indicative of the alternator current level provided to the input resistor and the level of alternator current indicated at the output are related by a first gain when the switching element is closed and are related by a second gain when the switching element is opened.

2. The system of claim 1, wherein the switching element is at least one of a field effect transistor, a metal oxide semiconductor field effect transistor, and a bipolar junction transistor.

3. The system of claim 1, wherein the first threshold is 93% of a lower scale range, and the second threshold is 10% of a higher scale range.

4. The system of claim 1, wherein the processor determines the current indication using a formula, and wherein the formula includes a first multiplicative factor when the switching element is on, and includes a second multiplicative factor when the switching element is off.

5. The system of claim 1, wherein a gain of the alternator increases by a factor of ten when the switching element is switched off.

6. The system of claim 1, wherein the level at the output is converted from an analog signal to a digital signal by an analog-to-digital converter before being provided to the processor.

7. The system of claim 1, further comprising a current transformer that is capable of being coupled to the alternator and providing the signal that is indicative of the alternator current level to the input resistor.

8. The system of claim 1, wherein the level at the output is at least one of a current and a voltage, and wherein the signal provided to the input resistor is at least one of a current and a voltage.

9. The system of claim 1, wherein the current indication is used to determine whether the alternator is potentially being exposed to excessive current and heat.

10. The system of claim 1, wherein the operational amplifier includes an additional input, and further comprising:

an additional input resistor coupled to the additional input, and;

an additional feedback resistor coupled between a voltage source and the additional input, wherein the additional feedback resistor is further coupled in parallel with a combination of an additional adjustment resistor and an additional switching element.

11. A system for accurately sensing current levels within an alternator, the system comprising:

an amplification means for amplifying or reducing a first signal indicative of a current level within the alternator to produce a second signal indicative of the current level;

a modification means for adjusting the level of amplification or reduction of the amplification means; and a processing means for controlling the modification means based upon at least one of the second signal and a third signal based upon the second signal, and for processing at least one of the second signal and the third signal to determine a current measurement value;

wherein the processing means causes the modification means to step down a gain of the amplification means when the current measurement value exceeds a first threshold, and the processing means causes the modification means to step up the gain of the amplification means when the current measurement value falls below at least one of the first threshold and a second threshold.

12. The system of claim 11, further comprising a current transformation means for receiving a fourth signal indicative of the current level within the alternator from the alternator and providing the first signal in response thereto.

13. A method of accurately sensing current levels within an alternator, the method comprising:

providing a differential amplifier configured to receive a first indication of a current level within the alternator at a first input port and to provide a second indication of the current level at an output port;

providing a processor in communication with a switching element of the differential amplifier and the output port;

receiving the first indication of the current level;

determining at the processor at least two measured current values based upon the second indication;

switching a status of the switching element to reduce a gain of the differential amplifier when the measured current values increase from being below a first threshold to exceed the first threshold; and switching the status of the switching element to increase the gain of the differential amplifier when the measured current values fall from above a second threshold to below the second threshold;

wherein the switching of the status of the switching element is caused by the processor based upon the measured current values.

14. The method of claim 13, further comprising:

changing a multiplicative factor within a formula used by a software routine of the processor to calculate the measured current values based upon the second indication when a status of the switching element is switched.

15. The method of claim 13, wherein when the switching element is switched off, a gain of the differential amplifier is at least one of increased and decreased by a factor of 10.

16. The method of claim 13, wherein the differential amplifier includes, between the first input port and the output port, at least one of a series combination of an adjustment resistor and the switching element in parallel with a feedback resistor, and a parallel combination of an adjustment resistor and the switching element in series with the feedback resistor.

17. The method of claim 13, wherein the first threshold is 93% of a lower scale range, and the second threshold is 10% of a higher scale range.

18. The method of claim 13, further comprising providing a current transformer which receives a current signal from the alternator and provides the first indication in response thereto.

19. The method of claim 13, further comprising converting the second indication from an analog signal to a digital signal by way of an analog-to-digital converter before it is utilized by the processor to determine the measured current values.

20. The method of claim 13, further comprising determining based upon the measured current values whether the alternator is potentially being exposed to excessive current and heat.

21. The system of claim 11, wherein the first threshold is identical to the second threshold.

* * * * *

UNITED STATES PATENT AND TRADEMARK OFFICE
CERTIFICATE OF CORRECTION

PATENT NO. : 6,731,098 B1
DATED : May 4, 2004
INVENTOR(S) : Hintz et al.

It is certified that error appears in the above-identified patent and that said Letters Patent is hereby corrected as shown below:

Column 1,
Line 11, "alternator particular" should be -- alternator. In particular --.

Column 8,
Line 62, "port and" should be -- port 501 and --.

Signed and Sealed this

First Day of February, 2005

JON W. DUDAS
*Director of the United States Patent and Trademark Office*